April 12, 1960   F. G. BACK   2,932,237
PHOTO-PERISCOPES
Filed April 2, 1957   2 Sheets-Sheet 1
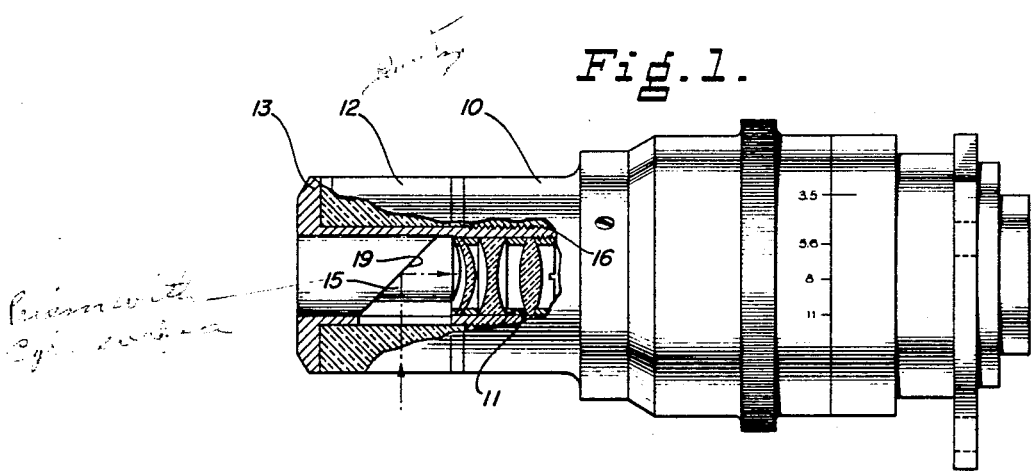
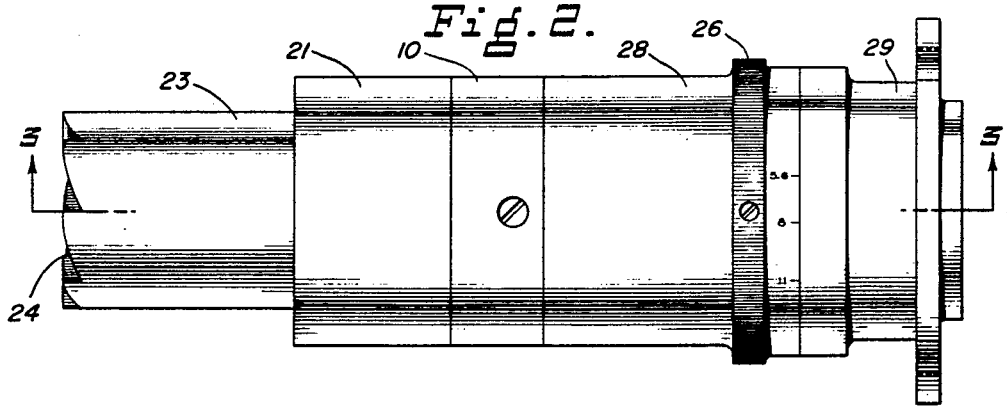
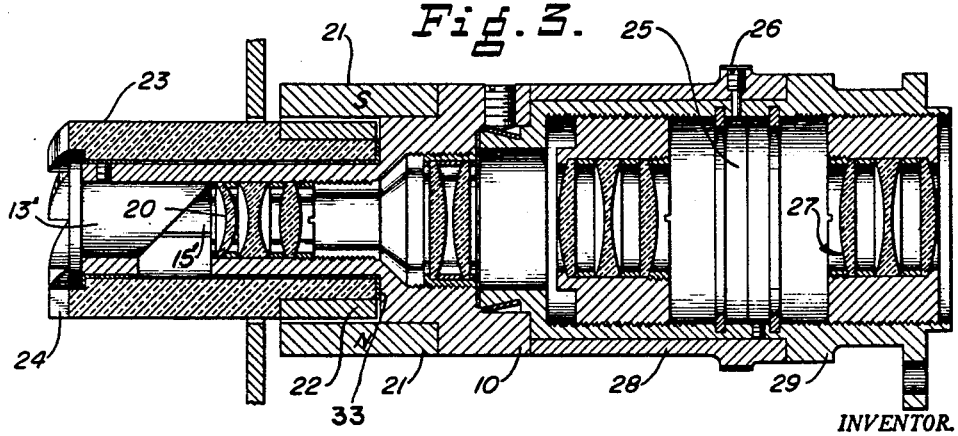
INVENTOR.
FRANK G. BACK
BY Albert F. Kronman
ATTORNEY April 12, 1960 F. G. BACK 2,932,237
PHOTO-PERISCOPES
Filed April 2, 1957 2 Sheets-Sheet 2
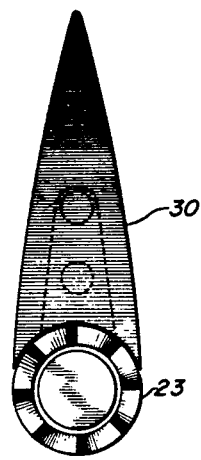
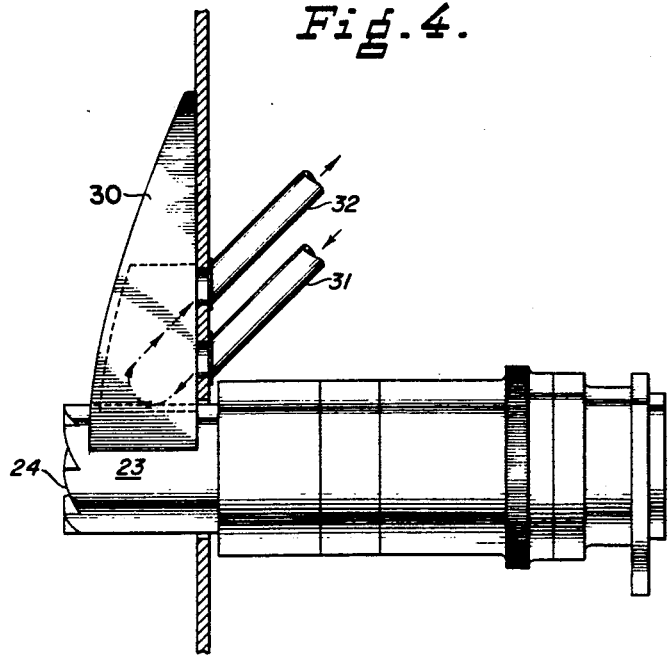
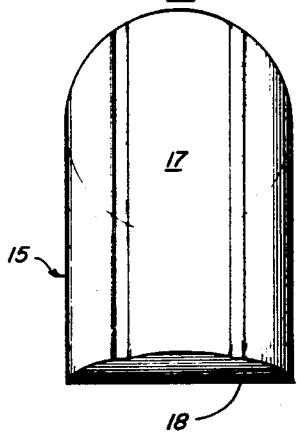
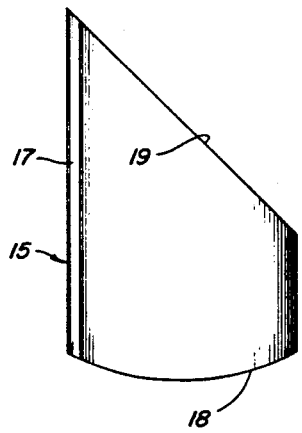
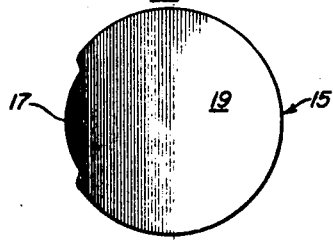
INVENTOR.
FRANK G BACK
BY
ATTORNEY

United States Patent Office 2,932,237
Patented Apr. 12, 1960

2,932,237
PHOTO-PERISCOPES
Frank G. Back, Lattingtown, N.Y.
Application April 2, 1957, Serial No. 650,244
8 Claims. (Cl. 88—72)

This invention relates to photo-periscopes and specifically such as may be used in conjunction with aircraft or missiles flying at supersonic speed.

In aircraft or missiles flying faster than the speed of sound, optical information can not be obtained for any length of time through windshields or any type of windows of customary construction. High temperatures resulting from the speed of the aircraft will cause any glass surface to crack and distort, and at speed over Mach 3.5, any glass or glass-like surface will start to glow and therefore impair the light transmission properties of said surfaces.

Accordingly, it is an object of the present invention to provide a new way of transmitting information from the outside into the craft or missile.

Another object of the present invention is to provide means for transmitting information either for photographic observation or for observation by television means within the aircraft.

A further object of the present invention is to provide a photo-periscope which will withstand extreme heat as well as shock and vibration resulting from flight conditions.

A feature of the present invention is its use of a heavy fused quartz cylinder cover which projects into the air stream.

Another feature of the present invention is its use of an anamorphic lens system for the purpose of producing satisfactory optical images.

A further feature of the present invention is its use of a rotating quartz cylinder for reducing the effect of excessive temperatures.

Another feature of the present invention is its use of a coolant directed at the quartz cylinder for dissipating the heat generated during flight.

The invention consists of the construction, combination and arrangement of parts, as herein illustrated, described and claimed.

In the accompanying drawings, forming a part hereof, are illustrated three forms of embodiment of the present invention, and in which:

Figure 1 is a view in side elevation, partly broken away, of one complete embodiment of the present invention.

Figure 2 is a view in side elevation of a second embodiment of the present invention.

Figure 3 is a longitudinal sectional view taken on line 3—3 in Figure 2.

Figure 4 is a view in side elevation of a third embodiment of the present invention.

Figure 5 is a top plan view of the embodiment shown in Figure 4.

Figure 6 is a view in front elevation of a prism, somewhat enlarged, made in accordance with the present invention.

Figure 7 is a view in side elevation of the prism shown in Figure 6.

Figure 8 is a top plan view of the prism shown in Figures 6 and 7.

Referring to the drawings, and specifically to Figure 1, 10 indicates a metal housing centrally bored, as indicated at 11 and having a centrally bored cylindrical member 12 secured at the top thereof by means of a cap 13. The cylindrical member 12 is preferably made of pure fused quartz, very accurately ground and polished and having a wall approximately ¼" thick. The cap 13 is secured to the housing 10 by means of the thread 16. The cap member 13 reaches the housing 10 by way of the central bore in the cylindrical quartz member. A prism 15 (best shown in Figures 6, 7, 8) is carried within the quartz member 12, by the cap 13. Light passing through the quartz member 12 reaches the prism 15 and is internally reflected downward at face 19 to the lens (as indicated by the dashed lines in Figure 1), to the lens system hereinafter more fully described.

The prism 15 is provided with a cylindrical surface 17 to receive the light passing through the silicate quartz member 12. The bottom of the prism member 15 is provided with a second cylindrical surface 18 which together with the curvature of the outer cylindrical member 12, and the first cylindrical surface 17, operates to form an anamorphic system of low anamorphic power. The first and second cylindrical surfaces 17 and 18 on the prism 15 serve to compensate for the cylindrical component of the outer quartz cylinder 12. It is within the purview of the present invention to make the bottom of the prism 15' flat and provide a lens 20 beneath it, as shown in Figure 3. The separate lens may be used in place of the second cylindrical surface 18 on the bottom of the prism.

After the light leaves the periscope prism 15 it is passed through lens groups similar to those shown in Figure 3 for the well known optical modification necessary to make it capable of producing a sharp image upon the photographic plate or within the television camera (not shown). The lens groups carried within the housing 10 are conventional and form no part of the present invention.

In the embodiment shown in Figure 1, only the quartz cylinder 12 will project beyond the surface of the plane. The remainder of the photo-periscope will be within the plane and not subject to the intense heat generated by supersonic airflow. By reason of the cylindrical shape of the quartz cylinder there is presented a highly favorable aero-dynamic form within the air stream. Accordingly, such structures will operate satisfactorily up to Mach 4, without becoming heated to the point of interfering with photographic efficiency. Above Mach 4, however, the quartz cylinder will begin to heat up and the embodiment shown in Figures 2, 3, 4, and 5, are preferred.

Referring to Figures 2 and 3, there is shown a photo-periscope having a housing 10 to which there is attached a magnet 21. The magnet 21 forms part of a magnetic drag, the remainder of which consists of a metal collar 22. The metal collar 22 is of hardened steel or other material which will have large hysteresis loss, and is carried within the magnet 21. The polarity of the magnet 21 results in a magnetic drag upon any rotation of the collar 22. The collar 22 is secured to the bottom of the cylindrical quartz member 23, which is internally and externally ground and polished to optical specifications. The cylinder is separated from the housing 10 by a suitable anti-friction material 33, such as Teflon.

The upper surface of the cylinder 23 is serrated to provide vanes as indicated at 24 in Figures 2 and 3. The vanes 24 extend into the air stream of the plane or missile and cause the cylinder 23 to rotate during flight. The rotation of the cylinder 23 is resisted by the magnetic drag 21, 22, hereinabove described. The inner optical construction of the photo-periscope shown in Figures 2 and 3 is similar to that described above in connection with Figure 1. These optical elements include the prism member 15' which is carried within the quartz cylindrical member 23, and which is held in place by the cap member 13'.

An anamorphic lens system is also used in conjunction with this embodiment of the invention for the same purpose as was set forth in connection with Figure 1. The photo-periscope in Figure 3 is provided with an iris 25 which is operated by the knurled ring 26. The periscope is focused by the lens system 27 according to well known optical methods. The metal housing 10 is elongated by auxiliary housing members 28 and 29, which make up the body of the photo-periscope and support the optical elements therein.

During flight conditions the photo-periscope shown in Figures 2 and 3 will present the fused quartz cylinder 23 to the air stream and will become heated on the side of the cylinder facing the direction of flight. As the cylinder 23 is rotated through the action of the vanes 24, the heated side of the cylinder will be moved to the rear of the structure. As the heated side of the cylinder 23 moves toward the position opposite the front of the cylinder, the air stream will conduct a certain amount of heat away from the said cylinder. Thus, during flight conditions the cylinder 23 will present a succession of surface areas of the cylinder 23 to the air stream, which surface areas will be cool and will be taken continuously out of the direct contact with the air stream as the cylinder 23 is slowly rotated.

For still higher speeds it is preferred to apply some means of direct cooling to the surface of the cylinder 23 which is opposite the direction of flight. Such direct cooling means is illustrated in Figures 4 and 5, where the cylinder 23 is provided with a rearwardly mounted housing 30 within which there are provided ducts 31 and 32 to receive and discharge a cooling fluid such as water, air, glycerine, or the like. The cooling fluid is directed by the duct 31 at the rearmost face of the cylinder 23 in its rotation past the housing 30 and is carried away by duct 32. In this manner the cylinder 23 will receive additional cooling in its rotational travel and will be capable of withstanding extremely high temperature brought about by speeds in excess of Mach 10.

It is within the purview of the present invention to eliminate the second duct 32 and to allow the coolant to vaporize upon the surface of the cylinder 23 and be dissipated into the air stream.

Having thus fully described the invention, what is claimed as new and sought to be secured by Letters Patent of the United States, is:

1. A photo-periscope for use in the slipstream of an aircraft traveling at supersonic speeds comprising, a housing, a transparent, hollow, cylindrical member secured to the upper end of the housing, a fixed prism member carried within the cylindrical member, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system, and lens means carried within the housing to direct the light coming from the prism into a photographic device.

2. A photo-periscope for use in the slipstream of an aircraft traveling at supersonic speeds comprising, a housing, a transparent, hollow, thick-walled cylindrical member formed of fused quartz and having optically ground and polished inner and outer curved surfaces secured to the upper end of the housing, a fixed prism member carried with the cylindrical member, a cap overlying the top of the cylindrical member and prism, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system of low anamorphic power, and lens means carried within the housing to direct the light coming from the prism into a photographic device.

3. A photo-periscope for use in the slipstream of an aircraft traveling at supersonic speeds comprising a housing, a transparent, hollow, cylindrical member rotatably secured to the upper end of the housing, a plurality of vanes cut in the outer end of the cylindrical member to impart a rotary movement to said cylindrical member, a fixed prism member carried within the cylindrical member, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system, and lens means carried within the housing to direct the light coming from the prism into a photographic device.

4. A photo-periscope for use in the slipstream of an aircraft traveling at supersonic speeds comprising, a housing, a transparent, hollow, cylindrical member rotatably secured to the upper end of the housing a plurality of vanes cut in the outer end of the cylindrical member to impart a rotary movement to said cylindrical member, means to retard the rotation of the cylindrical member, comprising a magnetic drag at the housing end of the cylinder, a fixed prism member carried within the cylindrical member, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system, and lens means carried within the housing to direct the light coming from the prism into a photographic device.

5. A photo-periscope for use in the slipstream of an aircraft traveling at supersonic speeds comprising, a housing, a transparent, hollow, thick-walled cylindrical member formed of fused quartz and having optically ground and polished inner and outer curved surfaces rotatably secured to the upper end of the housing, a plurality of vanes in the outer end of the cylindrical member to impart a rotary movement to said cylindrical member, means to retard the rotation of the cylindrical member, comprising a magnetic drag at the housing end of the cylinder, a fixed prism member carried within the cylindrical member, a cap overlying the top of the cylindrical member and prism, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system of low anamorphic power, and lens means carried within the housing to direct the light coming from the prism into a photographic device.

6. A photo-periscope for use in a slipstream of an aircraft traveling at supersonic speeds comprising, a first housing, a transparent, hollow, thick-walled cylindrical member rotatably secured to the upper end of the said housing, a plurality of vanes cut in the outer end of the cylindrical member to impart a rotary movement to said cylindrical member, a second housing adjacent the rear of the cylindrical member, a duct communicating with the interior of the second housing and directed at the cylindrical member, and a source of cooling fluid coupled to the duct, a fixed prism member carried within the cylindrical member, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system, and lens means carried within the first housing to direct the light coming from the prism into a photographic device.

7. A photo-periscope for use in a slipstream of an aircraft traveling at supersonic speeds comprising, a first housing, a transparent, hollow, thick-walled cylindrical member rotatably secured to the upper end of the said housing, a plurality of vanes cut in the outer end of the cylindrical member to impart a rotary movement to said cylindrical member, a second housing adjacent the rear of the cylindrical member, a first duct communicating with the interior of the second housing and directed at the cylindrical member, a second duct leading from the interior of the second housing to the outside thereof, and a source of cooling fluid coupled to the first duct, a fixed prism member carried within the cylindrical member, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system, and lens means carried within the first housing to direct the light coming from the prism into a photographic device.

8. A photo-periscope for use in the slipstream of an aircraft traveling at supersonic speeds comprising, a first housing, a transparent, hollow, thick-walled cylindrical member formed of fused quartz and having optically ground and polished inner and outer curved surfaces rotatably secured to the upper end of the said housing, a plurality of vanes in the outer end of the cylindrical member to impart a rotary movement to said cylindrical member, a magnetic drag at the housing end of the cylinder, a second housing adjacent the rear of the cylindrical member, a first duct communicating with the interior of the second housing and directed at the cylindrical member, a second duct leading from the interior of the second housing to the outside thereof, and a source of cooling fluid coupled to the duct, a fixed prism member carried within the cylindrical member, a cap overlying the top of the cylindrical member and prism, a first cylindrical surface on the side of the said prism to receive light passing through the cylindrical member, a second cylindrical surface on the bottom of said prism to receive light internally reflected by the prism, said first and second surfaces and the cylindrical member forming an anamorphic lens system of low anamorphic power, and lens means carried within the first housing to direct the light coming from the prism into a photographic device.

References Cited in the file of this patent

UNITED STATES PATENTS

| | | |
|---|---|---|
| 959,013 | Howell | May 24, 1910 |
| 1,021,809 | Wappler | Apr. 2, 1912 |
| 1,098,905 | Jacob | June 2, 1914 |
| 1,520,245 | Humbrecht | Dec. 23, 1924 |
| 1,687,193 | Bertele | Oct. 9, 1928 |
| 1,947,729 | Morrison | Feb. 20, 1934 |
| 2,311,769 | Mitchell | Feb. 23, 1943 |
| 2,556,769 | Miller | June 12, 1951 |
| 2,593,088 | Baker | Apr. 15, 1952 |
| 2,763,177 | Taylor | Sept. 18, 1956 |